(12) United States Patent
van Vredendaal et al.

(10) Patent No.: US 11,790,069 B2
(45) Date of Patent: Oct. 17, 2023

(54) BIOMETRIC SYSTEM

(71) Applicant: NXP B.V., Eindhoven (NL)

(72) Inventors: Christine van Vredendaal, Veldhoven (NL); Hans de Jong, Eindhoven (NL); Marc Vauclair, Overijse (BE)

(73) Assignee: NXP B.V., Eindhoven (NL)

( * ) Notice: Subject to any disclaimer, the term of this patent is extended or adjusted under 35 U.S.C. 154(b) by 44 days.

(21) Appl. No.: 17/658,034

(22) Filed: Apr. 5, 2022

(65) Prior Publication Data
US 2022/0229892 A1 Jul. 21, 2022

Related U.S. Application Data

(62) Division of application No. 16/752,734, filed on Jan. 27, 2020, now Pat. No. 11,328,045.

(51) Int. Cl.
| | |
|---|---|
| *G06F 21/32* | (2013.01) |
| *G06F 7/58* | (2006.01) |
| *G06F 21/60* | (2013.01) |
| *H04L 9/40* | (2022.01) |
| *G06V 10/74* | (2022.01) |
| *G06V 40/10* | (2022.01) |
| *G06V 40/12* | (2022.01) |
| *G06V 40/50* | (2022.01) |

(52) U.S. Cl.
CPC .............. *G06F 21/32* (2013.01); *G06F 7/582* (2013.01); *G06F 21/604* (2013.01); *G06V 10/761* (2022.01); *G06V 40/10* (2022.01); *G06V 40/1365* (2022.01); *H04L 63/1466* (2013.01); *G06F 2221/2103* (2013.01); *G06V 40/58* (2022.01)

(58) Field of Classification Search
CPC ....................................................... G06F 21/32
See application file for complete search history.

(56) References Cited

U.S. PATENT DOCUMENTS

| | | | |
|---|---|---|---|
| 9,942,042 B1* | 4/2018 | Friedman | H04L 9/3231 |
| 10,043,053 B2* | 8/2018 | Erhart | G06F 18/22 |
| 2015/0234757 A1* | 8/2015 | You | G06F 21/32 |
| | | | 710/267 |
| 2015/0235055 A1* | 8/2015 | An | G06F 21/74 |
| | | | 713/186 |
| 2016/0239686 A1* | 8/2016 | Kwon | G06F 21/602 |
| 2016/0350534 A1* | 12/2016 | Poornachandran | H04L 9/3273 |

(Continued)

*Primary Examiner* — Simon P Kanaan
(74) *Attorney, Agent, or Firm* — Daniel D. Hill

(57) ABSTRACT

A data processing system and a method are provided for recognizing a scanned biometric characteristic in the data processing system. The data processing system includes a biometric sensor, a rich execution environment (REE), and a secure element (SE). In one embodiment, during an enrollment operation, a random challenge is applied to scanned data to produce a biometric template that is stored. During subsequent validation operations, the SE determines if user data includes evidence of the random challenge before providing access to a secure application. Evidence of the random challenge indicates the user data was provided by the biometric sensor. In another embodiment, the sensor data is split between the REE and the SE and partially processed in the SE. The described embodiments prevent a replay attack from being conducted in communications between the REE and the SE.

7 Claims, 13 Drawing Sheets

(56) References Cited

U.S. PATENT DOCUMENTS

| | | | |
|---|---|---|---|
| 2017/0048240 A1* | 2/2017 | Chang | G06F 21/32 |
| 2017/0061441 A1* | 3/2017 | Kamal | G06Q 20/326 |
| 2017/0068953 A1* | 3/2017 | Kim | G06Q 20/3278 |
| 2019/0164156 A1* | 5/2019 | Lindemann | H04L 9/3271 |

* cited by examiner

BIOMETRIC SYSTEM

CROSS-REFERENCE TO RELATED APPLICATIONS

This application claims priority under 35 U.S.C. § 119 to U.S. patent application Ser. No. 16/752,734, filed on Jan. 27, 2020, the contents of which are incorporated by reference herein.

BACKGROUND

Field

This disclosure relates generally to identity validation, and more particularly, to a biometric system and method for recognizing a biometric characteristic in the biometric system.

Related Art

Biometrics refer to unique physical characteristics that can be used to identify or authenticate a person. The use of biometrics to control access to secure applications, such as payment applications, is becoming increasingly popular. The biometrics may include, for example, fingerprint scans, iris scans, facial recognition, and voice recognition. In an online environment, such as in an internet of things (IoT) application, the use of biometric authentication may be susceptible to a replay attack. In the replay attack, the attacker may remotely hack and record a signal for a biometric record, such as a fingerprint. The recorded fingerprint may then be replayed to a secure element of a system, bypassing the biometric sensor, to gain unauthorized access to an application secured with the fingerprint.

Therefore, a need exists for a method and system that addresses the above problem.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
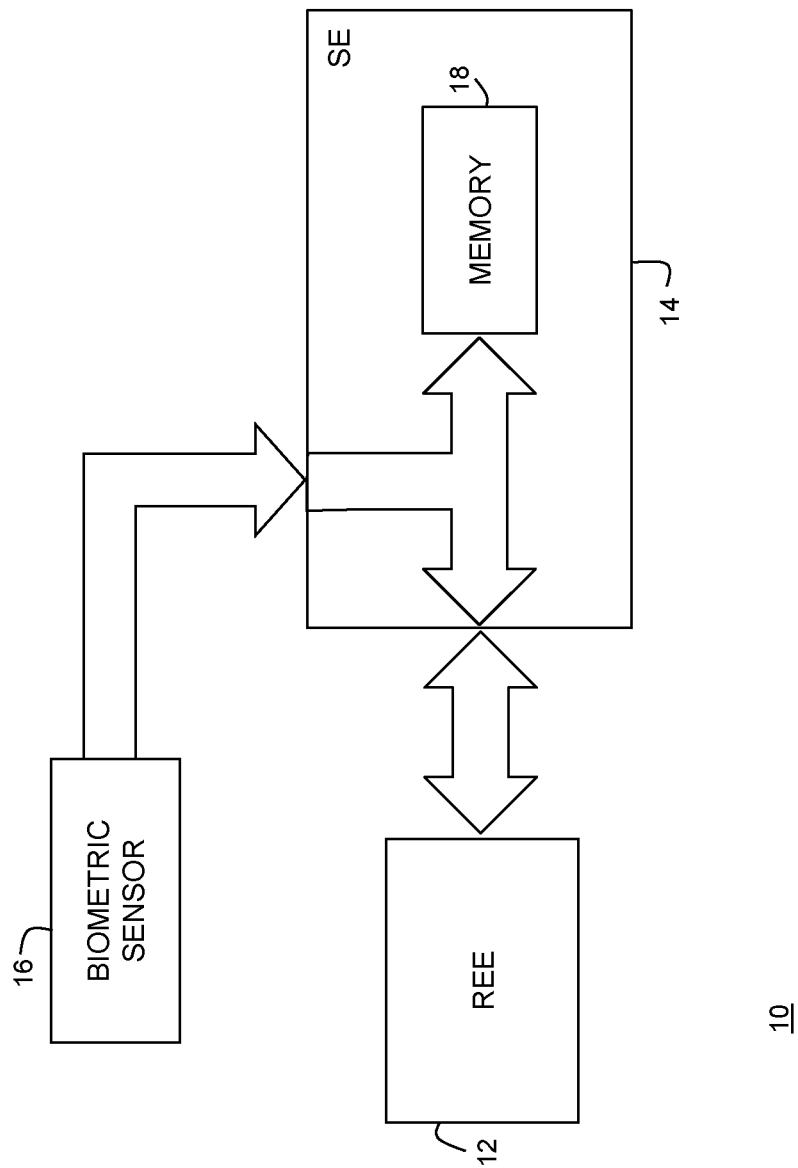
FIG. 1 illustrates a data processing system in accordance with an embodiment.

Generally, there is provided, a data processing system having a biometric sensor coupled to a rich execution environment (REE) and a secure element (SE). A REE generally has the most processing power of the data processing system but has very little or no security safeguards compared to a SE. A SE may include a secure memory for storing sensitive data and may be able to run certain applications, such as payment applications. However, typically, the memory of the SE is too small to store, transitorily or permanently, all the data required for biometric processing. In one embodiment, the secure element may be a trusted execution environment (TEE) having more functionality than a SE. For purposes of discussion, security safeguards are protections against malicious attacks and intrusion attempts. In an application operating in the internet of things (IoT), one embodiment of an REE is not hardened, and may not have enough security safeguards to protect against online threats and may be more vulnerable to attacks, such as replay attacks. Therefore, the disclosed embodiments provide a system and method for preventing replay attacks in an online environment.

In one example, a biometric sensor scans a biometric characteristic of a person. The biometric sensor has an output coupled to inputs of both the REE and the SE. A random challenge is generated in the SE and applied to the scanned data of the biometric characteristic during enrollment to produce a biometric template with the random challenge applied. During subsequent validation operations, the SE determines if input data includes evidence of the random challenge before providing access to a secure application. Evidence of the random challenge in the validated data indicates the data was provided by the biometric sensor. If there is no evidence of the random challenge in the input data, then a malicious attack may be occurring, and a response to the attack may be initiated.

In another example, the scanned biometric characteristic is divided into first and second parts. The first part is provided to the REE and the second part is provided to the SE. During enrollment, the first part is processed with a first function in the REE and the second part is processed with a second function in the SE. Also, the SE receives the processed first part from the REE. In one embodiment, the second function is a matching function, wherein during validation, the processed first part is compared to the processed second part to authenticate the biometric characteristic. The use of the SE as disclosed prevents, or at least makes more difficult, a replay attack on the communication between the REE and the SE.

In accordance with an embodiment, there is provided, a data processing system including: a biometric sensor for sensing a biometric characteristic having a first part and a second part; a rich execution environment having an input coupled to an output of the biometric sensor for receiving the first part, the first part being processed with a first function in the rich execution environment by a first processor; and a secure element having a relatively higher level of security than the rich execution environment, the secure element having a first input coupled to the output of the biometric sensor for receiving the second part, the secure element having a second input coupled to an output of the rich execution environment for receiving the processed first part, wherein a second processor in the secure element processes the second part with a matching function, and wherein the processed second part is compared with the processed first part for biometric matching. The first part may be a complete version of the biometric characteristic and the second part may be a summary of the biometric characteristic. A biometric template may be created for the complete version of the biometric characteristic in the rich execution environment during enrollment of a user. The data processing system may further include a third processor coupled to the biometric sensor, the third processor may perform a split of the biometric characteristic into the first part and the second part before the first part is provided to the rich execution environment and the second part is provided to the secure element. The secure element may further include a random number generator for generating a random challenge, the random challenge may be provided to the biometric sensor, wherein the random challenge is applied to the second part prior to the second part being provided to the rich execution environment. The random number generator may be further characterized as being a pseudo-random number generator. The data processing system may further include the secure element performing a checker function on the processed first part after the first part is processed by the rich execution environment. The checker function may be performed during both enrollment and validation operation of the data processing system. The secure element may include a memory for storing the second part.

In another embodiment, there is provided, a method for recognizing a scanned biometric characteristic in a processing system, the method including: using a biometric sensor, scanning a biometric characteristic of a user to provide first scanned data from the user; performing an enrollment operation of the first scanned data in the processing system, the enrollment operation including: receiving, from a secure element of the processing system, a random challenge; applying, by a processing unit, a function to the first scanned data and the random challenge to produce a biometric template of the user; and storing the biometric template in the processing system; and performing a validation operation of second scanned data, the validation operation including: checking, by the secure element, to determine if there is a trace of the random challenge in the second scanned data, wherein determining that there is a trace of the challenge in second scanned data indicates that the second scanned data is from the biometric sensor, and wherein determining that there is not a trace of the challenge in the second scanned data indicates that the second scanned data is not from the biometric sensor. Scanning the biometric characteristic may further include providing the first scanned data to the processing unit via the secure element. The processing unit may be part of a rich execution environment (REE), wherein the REE may have relatively less security than the secure element. Scanning the biometric characteristic may further include providing a first part of the first scanned data to the processing unit, and providing a second part of the first scanned data a second processing unit in the secure element, wherein the function may be applied to the first part to construct the biometric template, the biometric template provided to the secure element, and wherein during the validation operation, the secure element checks the biometric template for evidence of the random challenge in the second scanned data. The first part may be a complete version of the biometric characteristic and the second part may be a summary of the biometric characteristic. The method may further include storing the first part in a memory of the rich execution environment and storing the second part in a memory of the secure element. The random challenge may be pseudo-randomly generated in the secure element.

In yet another embodiment, there is provided, a method for operating a data processing system, the method including: during an enrollment operating phase of the data processing system, sensing a first biometric characteristic of a user; providing a first part of the first biometric characteristic to a first processor in a rich execution environment of the data processing system, and providing a second part of the first biometric characteristic to a second processor in a secure element of the data processing system, wherein the secure element has a relatively higher level of security than the rich execution environment; applying, by the first processor, a first function to the first part to construct a biometric template; providing the biometric template from the rich execution environment to the secure element; during a validation operating phase of the data processing system, receiving a second biometric characteristic; and processing the second biometric characteristic with a matching function to determine if the second biometric characteristic matches the biometric template. The method may further include applying a random challenge to the biometric characteristic in the biometric sensor. The random challenge may be pseudo-randomly generated in the secure element. The first part may be a complete version of the biometric characteristic and the second part may be a summary of the biometric characteristic.

FIG. 1 illustrates data processing system 10 in accordance with an embodiment. Data processing system 10 includes REE 12, SE 14, and biometric sensor (BS) 16. Biometric sensor 16 is coupled to SE 14 and REE 12 and receives sensor data from biometric sensor 16 through SE 14. Generally, an REE, such as REE 12, has most of the processing power of a data processing system but may not have enough protections against malicious attacks, such as the replay attacks mentioned above. Rich execution environment 12 is bi-directionally connected to SE 14. Memory 18 of SE 14 provides secure storage for data processing system 10. SE 14 may provide some secure processing functionality to execute various applications that require data protection such as, for example, payment applications. A TEE may be used in embodiments requiring secure memory and more processing capability than a SE can generally provide.

More specifically, biometric sensor 16 has an output connected to an input of SE 14. Biometric sensor 16 is configured to receive a biometric characteristic. For example, BS 16 may be a sensor for scanning a fingerprint. SE 14 receives the raw scan data from BS 16. Some or all the raw data may also be stored in memory 18. Rich execution environment 12 includes one or more processing units (not shown) that receive the raw sensor data from SE 14 and uses the raw sensor data to create a biometric template. In the illustrated example, secure element 14 includes at least enough processing capability to verify that the template computed in REE 12 matches the raw data scanned by BS 16 as will be described in the discussion of FIG. 2 and FIG. 3. Providing the scanned sensor data to REE 12 through the SE 14 helps to prevent a replay attack on the connection between REE 12 and SE 14. Enrollment and validation steps will be described in more detail in the discussion of FIG. 2 and FIG. 3, respectively.

Figure 2:
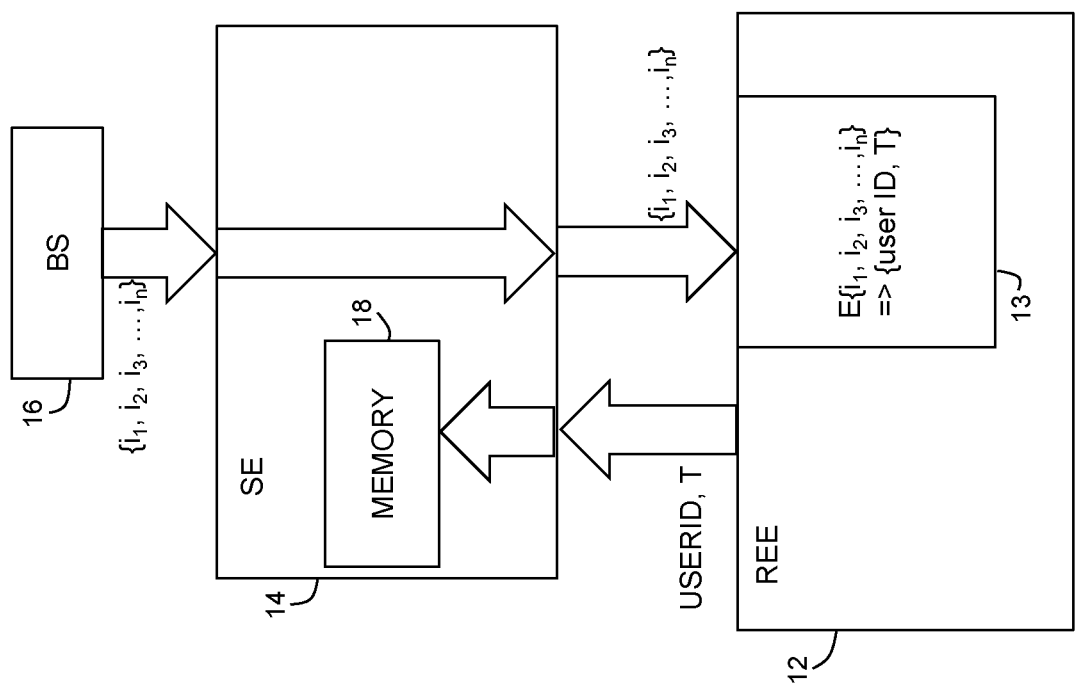
FIG. 2 illustrates a flow diagram of data through the data processing system of FIG. 1 for an enrollment operating phase in accordance with an embodiment.

FIG. 2 is a diagram illustrating data flow through data processing system 10 for an enrollment operating phase in accordance with an embodiment. Biometric enrollment (also sometimes spelled enrolment) is a process for sampling and storing a biometric characteristic, such as a fingerprint, for future use in securing and limiting access to private data. The biometric characteristic is scanned by the biometric sensor 16 and scanned raw data labeled $\{i_1, i_2, i_3, \ldots, i_n\}$ is provided from BS 16 to SE 14, where the multiple different raw elements i represent that in enrollment, multiple images might be taken of the, for example, finger or iris, to filter out variations, combine subscans, and generally create a more reliable and higher quality generated biometric template T. In one embodiment, i is pixel data for the computation of the, for example, fingerprint minutiae. The raw data $\{i_1, i_2, i_3, \ldots, i_n\}$ is passed through SE 14 and provided to REE 12 as shown in FIG. 2. Some or all the raw data may be stored in a memory 18 of SE 14 as the raw data is passed through. In REE 12, a processing function 13 of a processing unit processes the raw data with a function E and a user ID (USERID) to construct a biometric template T. In one embodiment, the user ID may have been previously loaded in REE 12. The biometric template T and USERID are then provide to SE 14 where they are securely stored in memory 18 for use during validation.

Figure 3:
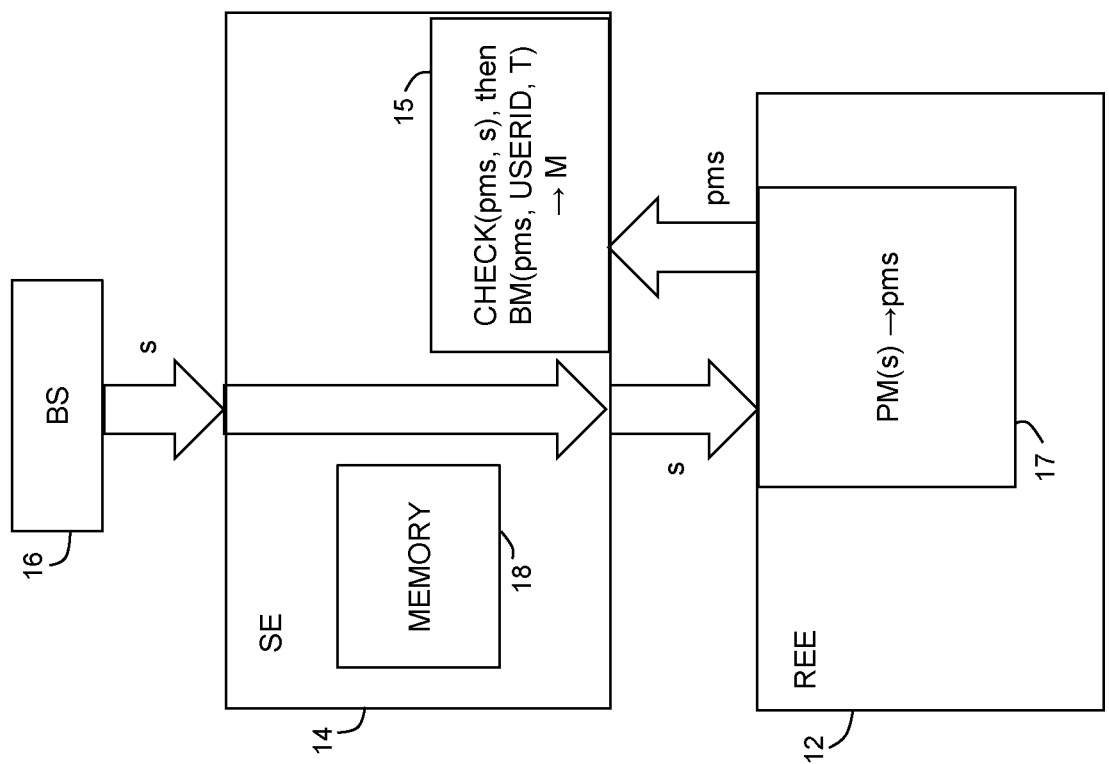
FIG. 3 illustrates a flow diagram of data through the data processing system of FIG. 1 for a validation operating phase in accordance with an embodiment.

FIG. 3 is a diagram illustrating data flow and operations in data processing system 10 of FIG. 1 for a validation operating phase in accordance with an embodiment. Data processing system 10 may be part of a smartcard (not shown) used for banking. As an example, biometric sensor 16 receives a fingerprint scan. Scan data s from BS 16 is provided to SE 14. Secure element 14 stores at least some of the raw data in memory 18 and passes the raw data to REE 12 as shown. Processing function 17 in REE 12 uses a function PM to process the signal resulting in a processed signal pms. The processed signal pms is then provided to SE 14. In SE 14, the processed signal pms is checked by a processing function 15 with a check function "CHECK (pms, s)." The check function determines if evidence can be found that processed signal pms is derived from raw data s initially provided by BS 16. That is, the check function checks if the processed signal pms provided by REE 12 is the result of the processing of scan data s. If the application of the check function CHECK does not find a match, then it is assumed the data was not received from biometric sensor 16, indicating a possibility of a replay attack. If, however, there is a match, then it is assumed the processed signal pms was properly computed from scan data s received from BS 16. A biometric matching function BM is performed on processed signal pms, USERID, and biometric template T as shown in processing function 15 to determine if the scanned biometric characteristic is the same as the enrolled biometric characteristic from the enrollment process of FIG. 2. Processing the PM function may be viewed as a pre-processing function, and the BM function may be viewed as final processing. In one embodiment, the total biometric matching is performed by the composition of functions PM and BM, where processing the PM function is the more resource demanding processing.

The matching function is performed in SE 14 and the processing of the PM function is performed in REE 12. Alternately, if enough processing power is available in SE 14, the processing of the PM function may be performed in SE 14. However, the typical SE does not have enough processing power to perform an intensive process. Therefore, the raw signal of scan data s is stored in memory 18 in SE 14 and the raw signal of scan s is passed on to REE 12 for processing of the PM function to extract minutiae from, for example, a fingerprint scan. Also, the computation of CHECK(pms,s) in processing function 15 may require many fewer resources than the computation of PM(s) in processing function 17.

Figure 4:
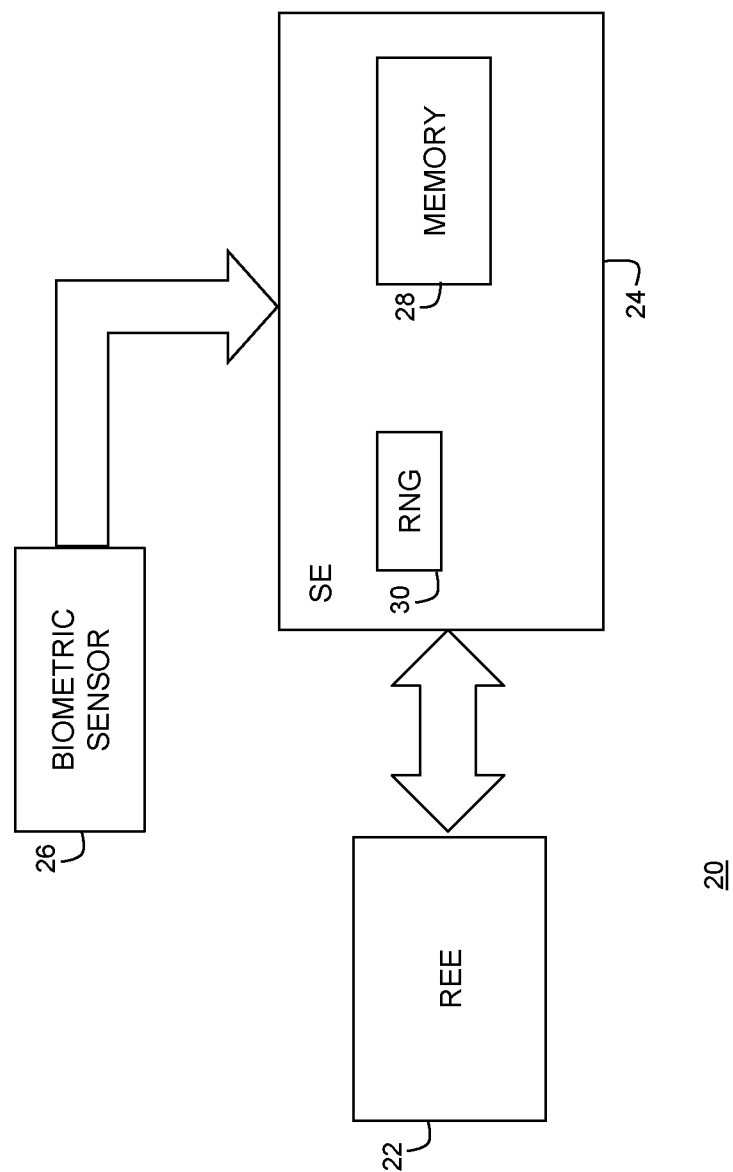
FIG. 4 illustrates a data processing system in accordance with another embodiment.

FIG. 4 illustrates data processing system 20 in accordance with another embodiment. Data processing system 20 includes REE 22, SE 24, and BS 26. Secure element 24 also includes memory 28 and random number generator 30. Random number generator 30 may be a pseudo-random number generator. As discussed above, rich execution environment 22 has most of the processing power of the data processing system but is considered unsecure and may not have enough protection against malicious attacks, such as the replay attacks mentioned above. REE 22 is bi-directionally connected to SE 24. Biometric sensor 26 has an output connected to an input of secure element 24. Secure element 24 provides secure storage for data processing system 20 and may provide secure processing functionality to execute various applications that require data protection such as, for example, payment applications. Biometric sensor 26 has an output connected to an input of SE 24. Biometric sensor 26 is configured to receive a biometric characteristic. For example, biometric sensor 26 may be a sensor for scanning a fingerprint. Rich execution environment 22 includes a processing unit (not shown in FIG. 4) that receives the raw sensor data and creates a biometric template from the raw sensor data. As discussed above, SE 24 has enough processing capability to verify that the template computed in REE 22 matches the raw data scanned by BS 26.

Random number generator 30 is used to produce a random challenge for performing a challenge-response communication with REE 22. SE 24 receives the raw data from BS 26 where some or all the raw data is stored in, for example, memory 28. In SE 24, the random challenge is applied to some or all the raw data. The raw data with the challenge applied is sent to REE 22 for processing. During a validation operation, the processed data is sent back to SE 24 and the processed data is checked for the random challenge. If the random challenge is not detected in the processed data, then the data being checked may not have been provided by BS 26, indicating a possible replay attack, wherein the process halts and access is denied. To successfully circumvent the challenge-response between SE 24 and REE 22, a replay attack on the connection between REE 22 and SE 24 would have to capture the output signal of SE 24, derive the random challenge, compute the appropriate response, and send the result to SE 24 without timing out. To create the challenge, a random number output received from RNG 30 and a processing unit of SE 24 embeds the random challenge in the output from BS 26. The random challenge is embedded so that it can be detected, removed, and/or reversed after the sensor data is processed by REE 22 but is not easily removed by a malicious attack on REE 22. Also, the use of the random challenge does not significantly affect the false rejection rate (FRR), speed, and security of the biometric processing. The enrollment and validation steps will be described in more detail in the discussion of FIG. 5 and FIG. 6, respectively.

Figure 5:
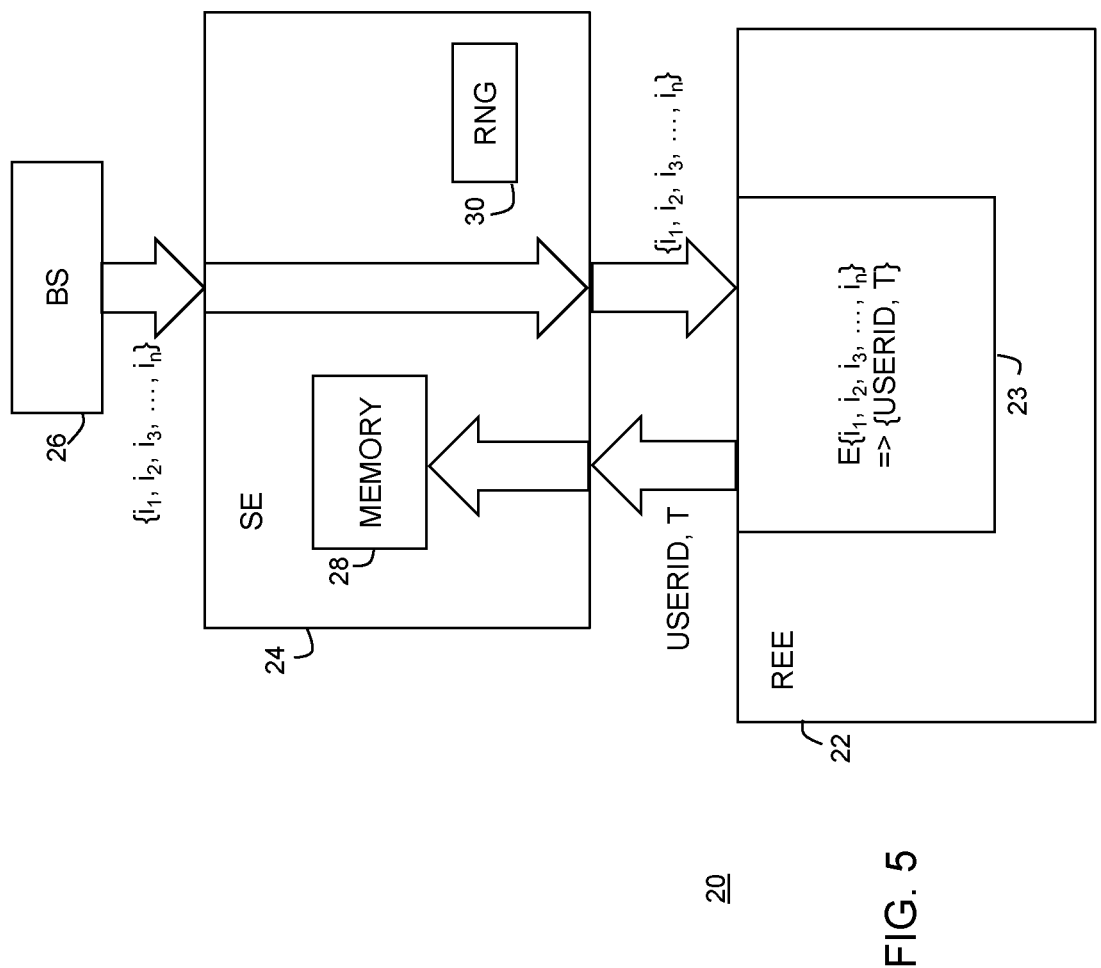
FIG. 5 illustrates a flow diagram of data through the data processing system of FIG. 4 for an enrollment operating phase in accordance with an embodiment.

FIG. 5 is a diagram illustrating data flow through data processing system 20 for an enrollment operating phase in accordance with an embodiment. The enrollment operating phase of data processing system 20 is the same as the enrollment phase of data processing system 10. A biometric characteristic is scanned by the BS 26 and raw data {$i_1$, $i_2$, $i_3$, ..., $i_n$} is provided from BS 26 to SE 24. The raw data {$i_1$, $i_2$, $i_3$, ..., $i_n$} is passed through SE 24 and provided to REE 22 as shown. Some or all the raw data may be stored in memory 28 of SE 14 as the raw data is passed through. In REE 22, a processor function 23 processes the raw data with a function E and the user ID (USERID) to construct a biometric template T. The biometric template T and USERID are then provide to SE 24 where they are securely stored in memory 28 for use during validation, described below.

Figure 6:
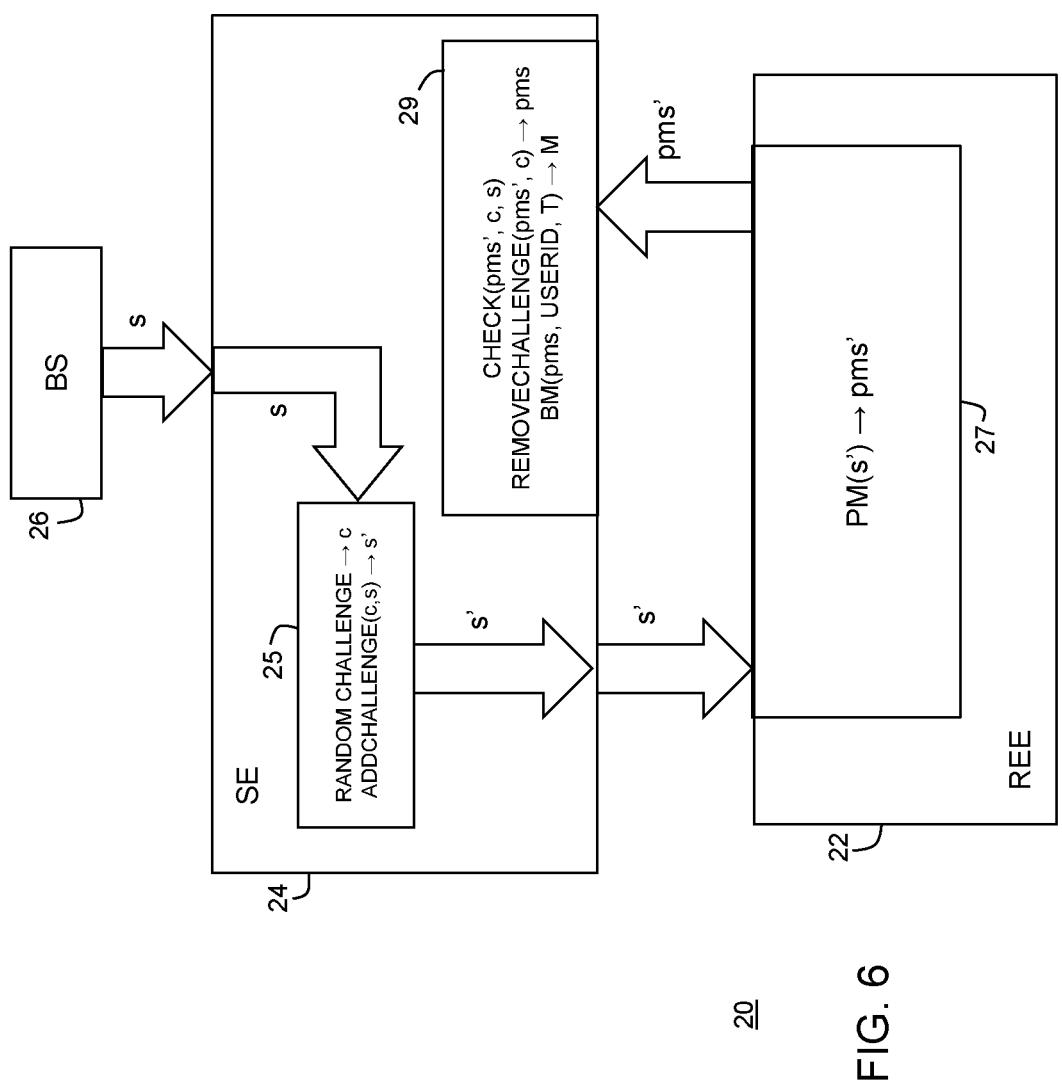
FIG. 6 illustrates a flow diagram of data through the data processing system of FIG. 4 for a validation operating phase in accordance with an embodiment.

FIG. 6 is a diagram illustrating a flow of data through data processing system 20 of FIG. 1 for a validation operating phase in accordance with an embodiment. Raw scan data s is provided from BS 26 to SE 24. Using a processing function 25, SE 24 generates a random challenge c (RANDOM CHALLENGE) using a random output from RNG 30. SE 24 embeds the random challenge using function ADDCHALLENGE into the raw data s to produce processed raw data s'. The processed raw data s' is transferred to REE 22. REE 22 uses a process function 27 (PM) to process the raw data s', resulting in processed data pms'. The processed data pms' is passed to SE 24. SE 24 uses, in processor function 29, a check function CHECK to check that processed data pms' contains a trace of the added challenge c, if a trace is not found, then a replay attack is suspected, and the process ends. If a trace of challenge c is not found, then it may be concluded that the scan data s did not come from BS 26 and may indicate a replay attack. However, if a trace of challenge c is found, processing continues, and the challenge c is removed from the processed data pms' by function REMOVECHALLENGE to produce processed data pms. The function REMOVECHALLENGE may be an identity function, defined generally as f(x)=x, if the presence of the challenge in processed data pms' does not influence the behavior of biometric matching function BM. SE 24 then uses a biometric matching function BM, the USERID, and the previously stored template T to determine if there is a match M. If there is a match, then the scan data s is probably from the same scanned biometric characteristic as the scan data used for the enrollment operation of FIG. 5. If there is not a match, then the scan data is not the same and access is denied. The addition of random challenge c is generally hard for an attacker to remove from processed raw data s', adding another layer of security.

Figure 7:
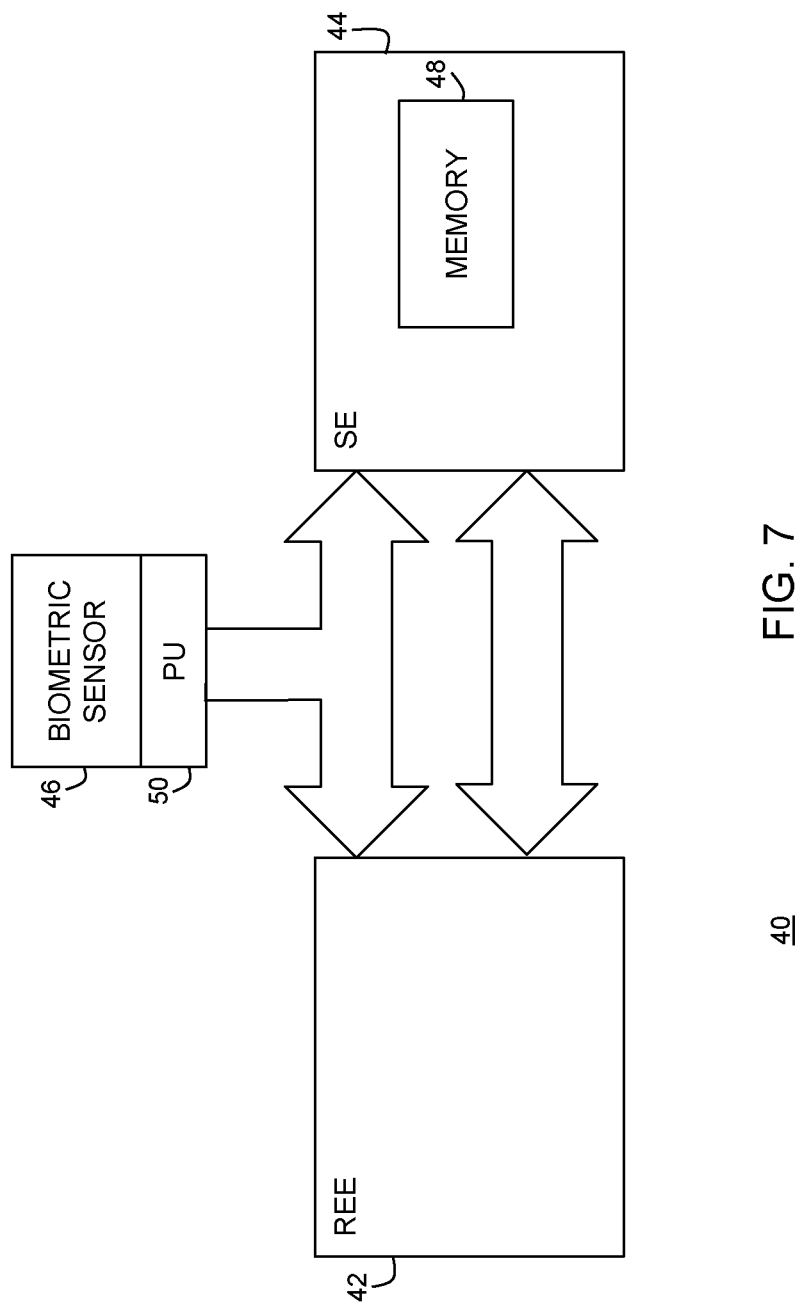
FIG. 7 illustrates a data processing system in accordance with another embodiment.

FIG. 7 illustrates data processing system 40 in accordance with another embodiment. Data processing system 40 includes REE 42, SE 44, and BS 46. Secure element 44 also includes memory 48. As discussed above, SE 44 has enough processing capability to verify that the template computed in REE 42 matches the raw data scanned by BS 46. Rich execution environment 42 has most of the processing power of data processing system 40 but may not have enough protections against malicious attacks, such as the replay attacks mentioned above. Rich execution environment 42 includes a processing unit (not shown) that receives the raw sensor data and creates a biometric template from the raw sensor data. REE 42 is bi-directionally connected to SE 44. Biometric sensor 46 has an output connected to inputs of both REE 42 and SE 44. Secure element 44 provides secure storage for data processing system 40 and may provide some secure processing functionality to execute various applications that require data protection such as, for example, payment applications. Biometric sensor 46 is configured to receive a biometric characteristic from a user. For example, BS 46 may be a sensor for scanning a fingerprint. Biometric sensor 46 is associated with a processing unit (PU) 50. Processing unit 50 may be a microcontroller unit (MCU). Processing unit 50 may be integrated with BS 46 on the same device or may be implemented separately. Also, the functionality of PU 50 may be provided by excess processing capability from REE 42.

In data processing system 40, the raw data from biometric sensor 46 is split between REE 42 and SE 44. A first part is processed and stored in the relatively unsecure REE 42. A second part is processed and stored in SE 44. The second part is used for validation operations. In one embodiment, the first part is the complete raw data from BS 46 for one scan, and the second part is a smaller portion of the raw data from BS 46. In one embodiment, the smaller portion may be considered to be a summary of the full complete version received by REE 42. Depending on the type of sensor, BE 46 may not be able to make the split between the first part and the second part on its own. A processor, such as PU 50, may be provided to pre-process and split the raw data on behalf of BS 46. In another embodiment, the processing capability may be provided by a processor of REE 42 or SE 44. Using PU 50 to perform the data split provides greater protection against any malicious actions in REE 42.

Figure 8:
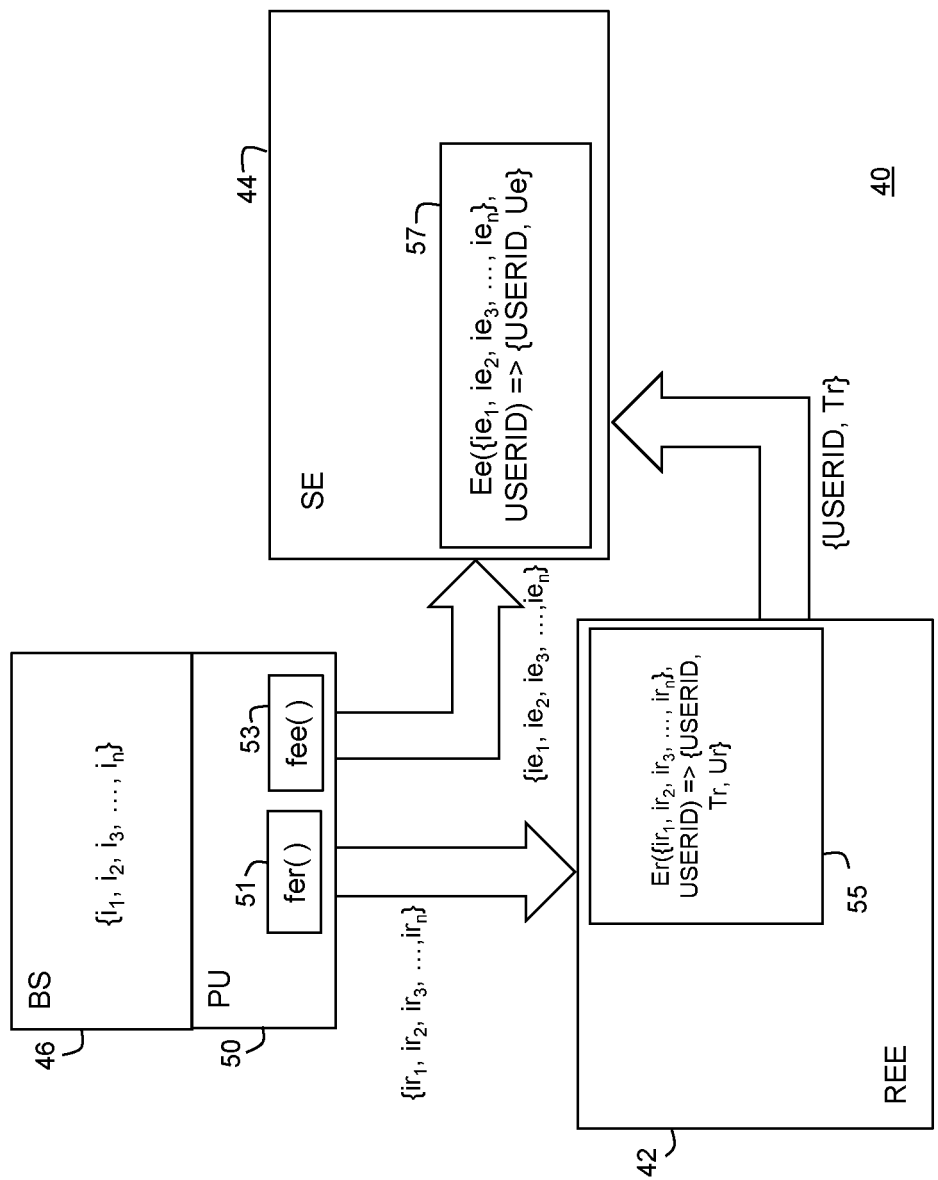
FIG. 8 illustrates a flow diagram of data through the data processing system of FIG. 7 for an enrollment operating phase in accordance with an embodiment.

FIG. 8 is a diagram illustrating data flow through data processing system 40 for an enrollment operating phase in accordance with an embodiment. A biometric characteristic is scanned by BS 46 and raw data from the scan {$i_1$, $i_2$, $i_3$, ..., $i_n$} is provided from BS 46. The raw data {$i_1$, $i_2$, $i_3$, ..., $i_n$} may be split by PU 50 and a first part is provided to REE 42 and a second part is provided to SE 44. Processing function 51 applies function fer( ) to the first part to produce processed first part {$ir_1$, $ir_2$, $ir_3$, ..., $ir_n$} and the processed first part is sent to REE 42. Processing function 53 applies function fee( ) to the second part to produce processed second part {$ie_1$, $ie_2$, $ie_3$, ..., $ie_n$} and the processed second part is provided to SE 44. The first and second parts may each include all the raw data or some predetermined portion of the raw data. In REE 42, the processed first part is further processed by processing function 55 using a function Er and the user ID (USERID) to generate one or more biometric templates T. In one embodiment, the function Er may include a signal pre-preprocessing function PEr (not shown) and a biometric enrollment function BEr (not shown). The resulting templates are split into two parts: a first part Tr that is stored in REE 42 and a second part Te that is securely stored in SE 44. Also, helper data U may be used in REE 42 to ease computations resulting in data Ur being stored in REE 42. REE 42 sends USERID, Tr, and Te to SE 44. SE 44 uses processing function 57 to process data {$ie_1$, $ie_2$, $ie_3$, ..., $ie_n$} with Ee and the USERID. The function Ee may include two functions (not shown) PEe (for pre-processing) and BEe (for biometric enrollment template). Helper data U may be used in SE 44 resulting in Ue. A resulting helper data result Ue, the USERID, and the templates Tr and Te may be stored in memory 28 of SE 42 to complete enrollment as illustrated in FIG. 8. After enrollment, at least part of the biometric template is stored in SE 44 and part is stored in REE 42. Depending on the embodiment, the helper data U may provide potentially necessary additional information to help in future biometric validations. A simple example of this may involve the scans from BS 46 which may be taken from various angles because a person may not apply their, for example, finger to BS 46 exactly the same way each time. This means the minutiae may be translated by the angle compared to the enrolled image. Helper data Ur/Ue may represent the angle of the image, compared to the enrollment image, such that the speed of future validations can be increased or made more accurate by application of the helper data.

Figure 9:
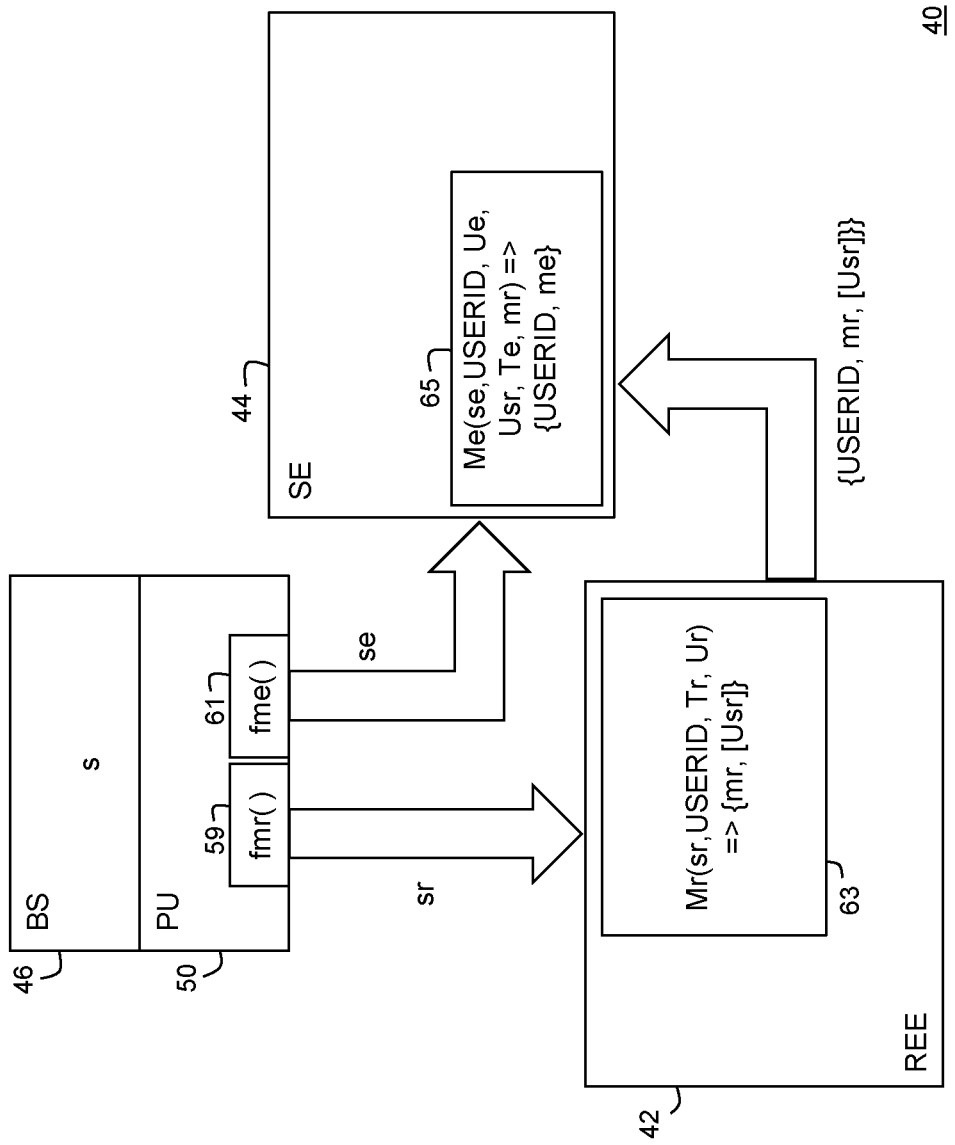
FIG. 9 illustrates a flow diagram of data through the data processing system of FIG. 7 for a validation operating phase in accordance with an embodiment.

FIG. 9 is a diagram illustrating a flow of data through data processing system 40 of FIG. 1 for a validation operating phase in accordance with an embodiment. A scan s is received by BS 46. PU 50 splits the raw scan data s into a first part and a second part as discussed above. A processing function 59 applies function fmr( ) to the first part to produce data sr. A processing function 61 applies function fme( ) to the second part to produce data se. Data sr is provided to REE 42 and the data se is provided to the SE 44. REE 42 uses processing function 63 to apply matching function Mr, USERID, and the template Tr to data sr to produce data mr. The matching function Mr may include two functions (not shown): PMr (signal pre-processing) and BMr (biometric matching), but these functions do not have to be the same as Pr, PEr, and BEr described above regarding the enrollment operating phase. The resulting data mr can be a real-valued element in the interval [0, 1] and indicates a matching grade, or rank, of sr with the stored template Tr. Helper data Usr may be a by-product of the computations. The result is function mr and helper data result Usr. REE 42 provides {USERID, mr, [Usr]} to SE 44. SE 44 uses processing function 65 to process with matching function Me the data se, USERID, Ue, Usr, Te, and mr to produce resulting data me and USERID. The matching function Me is used to compare/match the pre-processed data se with the template Te for the USERID. The matching function Me can be two functions (not shown): PMe (signal pre-processing) and BMe (biometric matching), but these two functions do not have to be the same as PMr and BMr mentioned above. If the computed matching operation in SE 44 using data se, Ue, and Te contradicts the resulting data mr provided by REE 42, a hypothesis can be made that REE 42 has not functioned as expected and resulting data me provided by SE 44 will indicate no match. Otherwise, resulting data me will be based on the combination of result mr from REE 42 and result me from SE 44.

Splitting the scanned raw data as described provides an advantage of reducing the bandwidth required of SE 44 for scanned raw data algorithms/templates that are too large for processing or storage in SE 44 alone. For example, in an application using a neural network (NN) to perform voice or facial recognition, an embodiment of data processing system 40 may be used. In the case of voice, the audio sensor records a voice clip. For a full NN to take all frequencies of the voice clip as input would be too large to fit in a typical secure element. A split of the data by frequency may be done and a part of the split data sent to the secure element. A probability mr may be computed by the NN. The SE may compute a probability me. The probabilities mr and me can be compared to some threshold to determine if there is a match.

Figure 10:
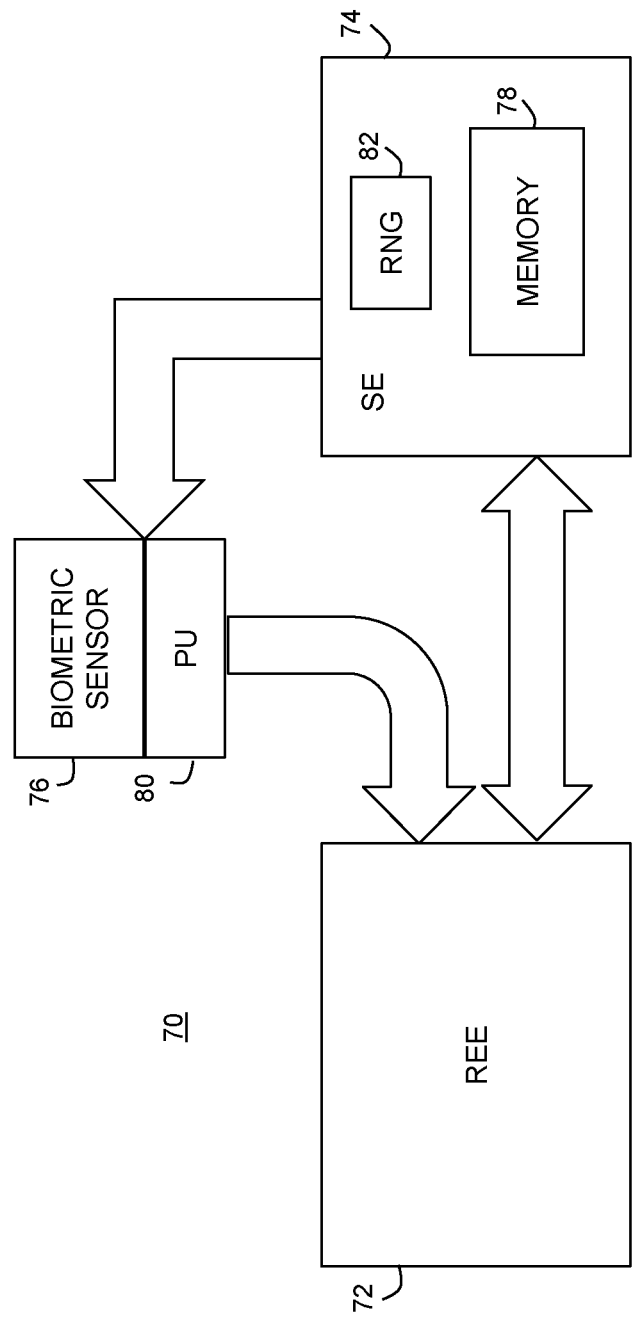
FIG. 10 illustrates a data processing system in accordance with another embodiment.

FIG. 10 illustrates data processing system 70 in accordance with another embodiment. Data processing system 70 includes REE 72, SE 74, and BS 76. Secure element 74 also includes memory 78 and RNG 82. Biometric sensor 76 is associated with MCU 80. Processing unit 80 may be integrated with BS 76 or may be implemented separately. Also, the functionality of PU 80 may be provided by excess processing capability from REE 72 or SE 74. As previously discussed for other embodiments, SE 74 has enough processing capability to verify that the template computed in REE 72 matches the raw data scanned by biometric sensor 76. Rich execution environment 72 has most of the processing power of the data processing system but not enough protections against malicious attacks, such as the replay attacks mentioned above. Rich execution environment 72 includes a processing unit that receives the raw sensor data and creates a biometric template from the raw sensor data. REE 72 is connected to SE 74 to receive sensor data. Secure element 74 has an output connected to an input of biometric sensor 76. Secure element 74 provides secure storage for data processing system 70 and may provide some secure processing functionality to execute various applications that require data protection such as, for example, payment applications. Biometric sensor 76 is configured to receive a biometric characteristic from a user. For example, biometric sensor 76 may be a sensor for scanning a fingerprint.

In data processing system 70, secure element 74 generates a random challenge using a randomly generated number from RNG 82. The random challenge is provided to BS 76 which combines the random challenge with raw scanned data and provides the combination to REE 72. PU 80 provides the processing capability necessary to make the combination of raw sensor data and random challenge. REE 72 performs further processing on the raw sensor data and random challenge to create a template. The processed data is then sent to SE 74. During validation, SE 74 performs a checking function to detect the presence of the challenge. Detecting that the challenge is present in the scanned data indicates that the scanned data came from BS 76 and not from another source bypassing BS 76, such as in a replay attack.

Figure 11:
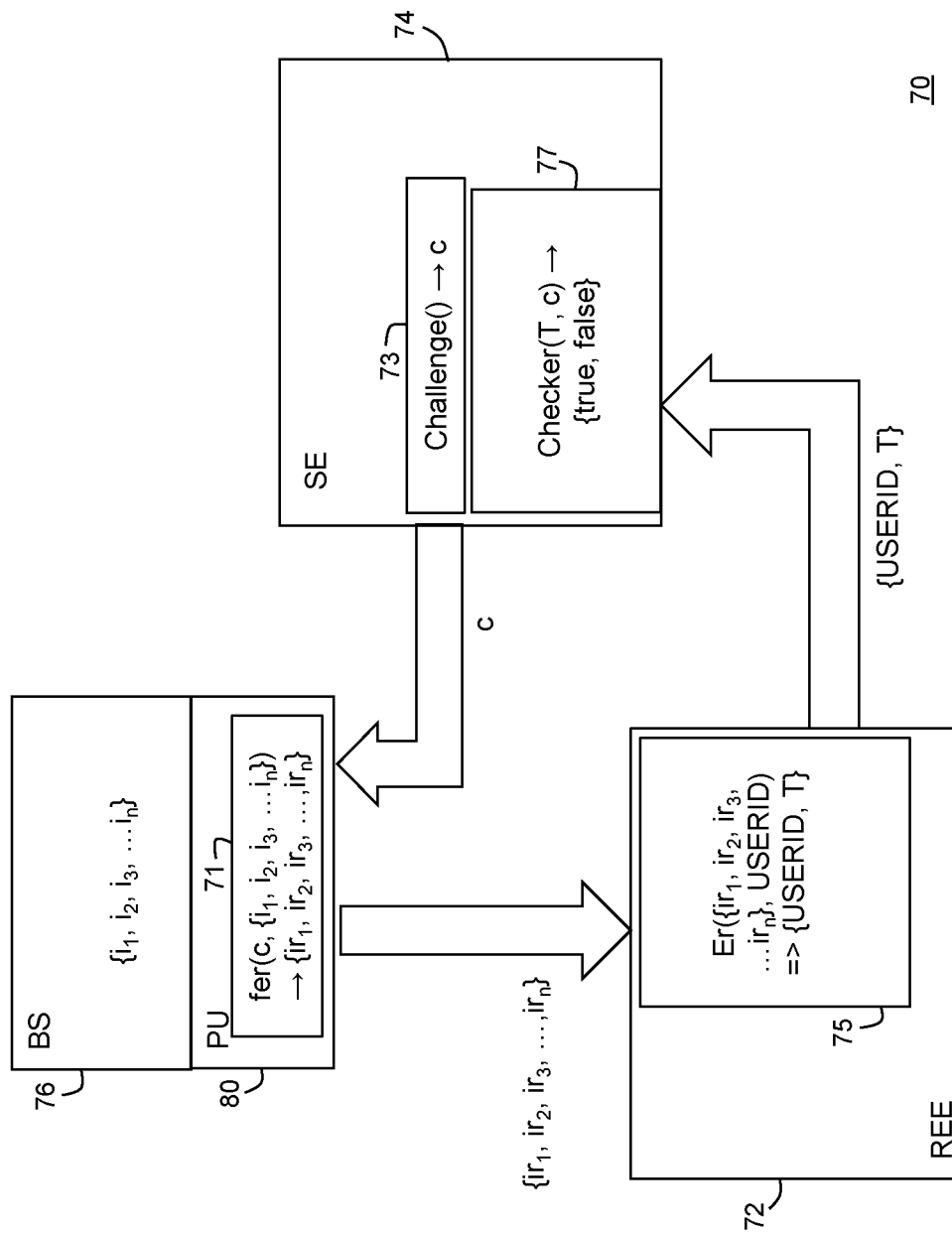
FIG. 11 illustrates a flow diagram of data through the data processing system of FIG. 10 for an enrollment operating phase in accordance with an embodiment.

FIG. 11 is a diagram illustrating data flow through data processing system 70 for an enrollment operating phase in accordance with an embodiment. A biometric characteristic is scanned by the biometric sensor 76 and raw data from the scan $\{i_1, i_2, i_3, \ldots, i_n\}$ is provided from BS 76. A random challenge c is created using processing function 73 in SE 64 using a random number from RNG 82 (not shown in FIG. 11, see FIG. 10) and provided to MCU 70. Processing unit 80 uses processing function 71 to apply a function fer( ) to the random challenge c and scan data $\{i_1, i_2, i_3, \ldots, i_n\}$ to produce processed data $\{ir_1, ir_2, ir_3, \ldots, ir_n\}$. The processed data $\{ir_1, ir_2, ir_3, \ldots, ir_n\}$ is sent to REE 72. REE 72 uses processing function 75 to perform further processing with a function Er on the processed data $\{ir_1, ir_2, ir_3, \ldots, ir_n\}$ and user ID (USERID) to construct one or more templates T. The function Er may include two functions (not shown): PEr (signal processing) and BEr (biometric enrollment). REE 72 sends the template T and USERID to SE 74. SE 74 uses processing function 77 to perform a checker function on the template T and the random challenge c to check for evidence of random challenge c in template T. If evidence of random challenge c in not found, then it is concluded that template T was not constructed from scan data from BS 76 and may have been provided as a replay attack. However, if evidence of random challenge c is found, then it is concluded that the template was constructed from scan data from BS 76. The template is stored in secure memory 78 of SE 74 (shown in FIG. 10).

Figure 12:
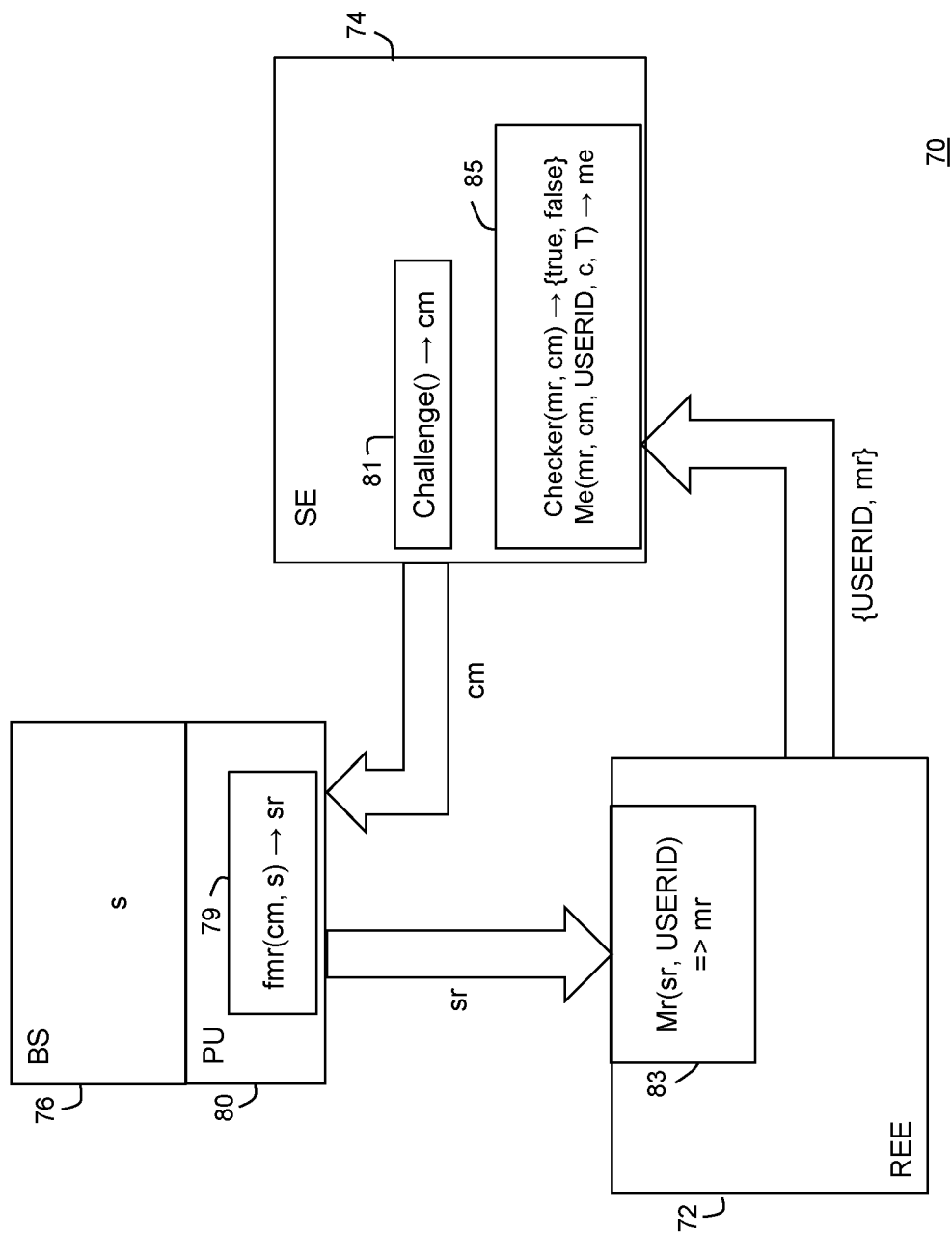
FIG. 12 illustrates a flow diagram of data through the data processing system of FIG. 10 for a validation operating phase in accordance with an embodiment.

FIG. 12 is a diagram illustrating a flow of data through data processing system 70 of FIG. 1 for a validation operating phase in accordance with an embodiment. A scan s is received by BS 76. A random challenge cm is generated by SE 74 using RNG 82 and sent to PU 80. Processing unit 80 uses processing function 79 to apply function fer to scan s and random challenge cm to produce result sr. Random challenge cm was generated in SE 74 using processing function 81. Result sr is provided to REE 72 for further processing by processing function 83. REE 72 applies function Mr to result sr and USERID to produce result mr. Function Mr may include two functions (not shown): a signal processing function PMr and a biometric enrollment function BMr. The result mr and USERID are sent to SE 74. SE 74 uses processing function 85 to perform a checker function on the received template mr and the challenge cm to see if there is evidence of challenge cm in result mr. If there is no evidence of challenge cm in template T, then it is concluded that the template did not come from BS 76 or is not the result of processing sr and the method ends as being the result of a replay attack. If, however, there is evidence of challenge cm in result mr, then SE 74 performs a matching function Me using result mr, challenge cm, USERID, challenge c from the enrollment method, and template T from the enrollment method to produce a float value me in the interval [0, 1]. If the float value is above a set threshold in the interval, then a match is concluded and access to the application is granted. Otherwise, the match fails.

Figure 13:
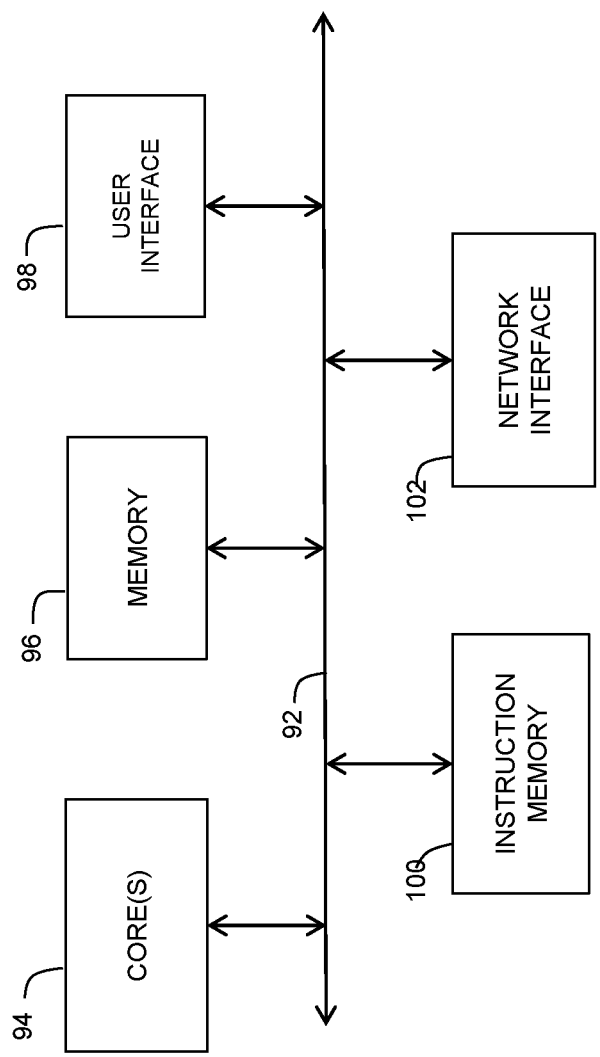
FIG. 13 illustrates an example microcontroller unit for use in the data processing systems of FIG. 1, FIG. 4, FIG. 7, and FIG. 10.

FIG. 13 illustrates an example processor 90 for use in the data processing systems of FIG. 1, FIG. 4, FIG. 7, and FIG. 10. Connected to bus 92 is one or more processor cores 94, memory 96, user interface 98, instruction memory 100, and network interface 102. In an actual implementation, processor 90 would include additional blocks or circuits not shown in FIG. 1. For example, processor 90 may include various peripherals depending on the application. By way of example, in an internet of things (IoT) application, the peripherals may include a UART (universal asynchronous receiver transmitter) module, a CAN (controller area network) module, a direct memory access (DMA) module, a phase locked loop (PLL), a graphics processor, various sensors, one or more timers, etc. Processor 90 may be implemented on a single integrated circuit (IC) or on multiple ICs. Processor cores 94 may be any hardware device capable of executing instructions stored in memory 96 or instruction memory 100. For example, processor cores 94 may execute the machine learning algorithms described above. Processor 90 may be, for example, a microcontroller (MCU) microprocessor (MPU), field programmable gate array (FPGA), application-specific integrated circuit (ASIC), or similar device.

Memory 96 may be any kind of memory, such as for example, L1, L2, or L3 cache or system memory. Memory 96 may include volatile memory such as static random-access memory (SRAM) or dynamic RAM (DRAM), or may include non-volatile memory such as flash memory, read only memory (ROM), or other volatile or non-volatile memory. Also, memory 96 may be implemented in a secure hardware element. Alternately, memory 86 may be a hard drive implemented externally to processor 90.

User interface 98 may be connected to one or more devices for enabling communication with a user such as an administrator. For example, user interface 98 may be enabled for coupling to a display, a mouse, a keyboard, or other input/output device. Network interface 102 may include one or more devices for enabling communication with other hardware devices. For example, network interface 102 may include, or be coupled to, a network interface card (NIC) configured to communicate according to the Ethernet protocol. Also, network interface 102 may implement a TCP/IP stack for communication according to the TCP/IP protocols. Data samples for classification may be input via network interface 102, or similar interface. Various other hardware or configurations for communicating are available.

Instruction memory 100 may include one or more machine-readable storage media for storing instructions for execution by processor cores 94. In other embodiments, both memories 96 and 100 may store data upon which processor cores 94 may operate. Memories 96 and 100 may also store, for example, encryption, decryption, and verification applications. Memories 96 and 100 may be implemented in a secure hardware element and be tamper resistant.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for recognizing a scanned biometric characteristic in a processing system, the method comprising:
using a biometric sensor, scanning a biometric characteristic of a user to provide first scanned data from the user;
performing an enrollment operation of the first scanned data in the processing system, the enrollment operation including:
receiving, from a secure element of the processing system, a random challenge;
applying, by a processing unit, a function to the first scanned data and the random challenge to produce a biometric template of the user; and
storing the biometric template in the processing system; and performing a validation operation of second scanned data, the validation operation including:
checking, by the secure element, to determine if there is a trace of the random challenge in the second scanned data, wherein determining that there is a trace of the challenge in second scanned data indicates that the second scanned data is from the biometric sensor, and wherein determining that there is not a trace of the challenge in the second scanned data indicates that the second scanned data is not from the biometric sensor.

2. The method of claim 1, wherein scanning the biometric characteristic further comprises providing the first scanned data to the processing unit via the secure element.

3. The method of claim 2, wherein the processing unit is part of a rich execution environment (REE), wherein the REE has relatively less security than the secure element.

4. The method of claim 3, wherein scanning the biometric characteristic further comprises providing a first part of the first scanned data to the processing unit, and providing a second part of the first scanned data a second processing unit in the secure element, wherein the function is applied to the first part to construct the biometric template, the biometric template provided to the secure element, and wherein during the validation operation, the secure element checks the biometric template for evidence of the random challenge in the second scanned data.

5. The method of claim 4, wherein the first part is a complete version of the biometric characteristic and the second part is a summary of the biometric characteristic.

6. The method of claim 5, further comprising storing the first part in a memory of the rich execution environment and storing the second part in a memory of the secure element.

7. The method of claim 1, wherein the random challenge is pseudo-randomly generated in the secure element.

* * * * *